(12) United States Patent
Pasquarelli

(10) Patent No.: US 12,286,056 B2
(45) Date of Patent: Apr. 29, 2025

(54) VEHICLE WINDOW PANE COMPRISING A LIGHT SOURCE AND A LIGHT-CONDUCTING LAYER

(71) Applicant: Webasto SE, Stockdorf (DE)

(72) Inventor: Robert Pasquarelli, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 281 days.

(21) Appl. No.: 17/910,302

(22) PCT Filed: Mar. 30, 2021

(86) PCT No.: PCT/EP2021/058307
§ 371 (c)(1),
(2) Date: Sep. 8, 2022

(87) PCT Pub. No.: WO2021/198262
PCT Pub. Date: Oct. 7, 2021

(65) Prior Publication Data
US 2023/0118480 A1    Apr. 20, 2023

(30) Foreign Application Priority Data
Apr. 3, 2020    (DE) .................... 10 2020 109 338.1

(51) Int. Cl.
*B60Q 3/208*    (2017.01)
*B32B 3/08*    (2006.01)
(Continued)

(52) U.S. Cl.
CPC ............... *B60Q 3/208* (2017.02); *B32B 3/08* (2013.01); *B32B 17/10036* (2013.01);
(Continued)

(58) Field of Classification Search
None
See application file for complete search history.

(56) References Cited

U.S. PATENT DOCUMENTS 5,341,230 A † 8/1994 Smith
8,829,539 B2 † 9/2014 Kleo
(Continued)

FOREIGN PATENT DOCUMENTS

CN    1504808 A    6/2004
CN    103260918 A    8/2013
(Continued)

OTHER PUBLICATIONS

International Search Report for PCT/EP2021/058307 mailed Jul. 14, 2021, in English and German (8 pages).
(Continued)

*Primary Examiner* — Ashok Patel
(74) *Attorney, Agent, or Firm* — Fitch, Even, Tabin & Flannery, LLP

(57) ABSTRACT

A vehicle window pane having a window pane body assembly having an outer side, which faces a vehicle environment, and an inner side, which faces a vehicle interior, and having a light-conducting layer; and a light source configured to couple its light into the light-conducting layer. An input coupling element coupling light emitted by the light source into the light-conducting layer is disposed on the inner side of the window pane body assembly.

21 Claims, 5 Drawing Sheets

(51) Int. Cl.
- *B32B 17/10* (2006.01)
- *B60Q 3/74* (2017.01)
- *B62D 25/06* (2006.01)
- *F21V 8/00* (2006.01)

(52) U.S. Cl.
CPC .... *B32B 17/10761* (2013.01); *B32B 17/1077* (2013.01); *B60Q 3/74* (2017.02); *B62D 25/06* (2013.01); *G02B 6/001* (2013.01); *G02B 6/0028* (2013.01); *G02B 6/0046* (2013.01); *G02B 6/0053* (2013.01); *G02B 6/0095* (2013.01); *B32B 2250/40* (2013.01); *B32B 2307/412* (2013.01); *B32B 2605/006* (2013.01)

(56) References Cited

U.S. PATENT DOCUMENTS

| | | | |
|---|---|---|---|
| 9,403,477 B2 † | 8/2016 | Richard | |
| 10,605,431 B2 † | 3/2020 | Vasylyev | |
| 10,901,131 B2 † | 1/2021 | Schabacker | |
| 2002/0040964 A1 | 4/2002 | Dausmann et al. | |
| 2004/0130882 A1 | 7/2004 | Hara et al. | |
| 2011/0267833 A1 | 11/2011 | Verrat-Debailleul | |
| 2014/0240997 A1 | 8/2014 | Massault et al. | |
| 2015/0009687 A1 † | 1/2015 | Lin | |
| 2015/0160400 A1 | 6/2015 | Massault et al. | |
| 2017/0045666 A1 † | 2/2017 | Vasylyev | |
| 2018/0001751 A1 | 1/2018 | Thannheimer et al. | |
| 2018/0086028 A1 † | 3/2018 | Berard | |
| 2018/0188437 A1 † | 7/2018 | Hagen | |
| 2019/0176691 A1 † | 6/2019 | Vervoort | |
| 2020/0201113 A1 * | 6/2020 | Baierl | G02F 1/1333 |

FOREIGN PATENT DOCUMENTS

| | | | |
|---|---|---|---|
| CN | 107107720 A | | 8/2017 |
| DE | 10332158 A1 | | 2/2005 |
| DE | 102009007198 A1 | | 8/2010 |
| DE | 102017120028 A1 | | 2/2019 |
| EP | 1195598 A2 | | 4/2002 |
| FR | 2982196 A1 | | 5/2013 |
| JP | H03-297003 A | † | 12/1991 |
| JP | H 11-219610 A | | 8/1999 |
| JP | 2000-249837 A | | 9/2000 |
| JP | 2002-109938 A | | 4/2002 |
| JP | 2004-165124 A | | 6/2004 |
| JP | 2012-507136 A | | 3/2012 |
| WO | 2013167832 A1 | | 11/2013 |
| WO | 2016113027 A1 | | 7/2016 |
| WO | 2018178591 A1 | † | 10/2018 |
| WO | 2019011677 A1 | † | 1/2019 |
| WO | 2019069909 A1 | † | 4/2019 |
| WO | 2021198262 A1 | | 10/2021 |

OTHER PUBLICATIONS

Office Action issued against corresponding Japanese Patent Application No. 2022-555850; mailed Oct. 27, 2023; In Japanese with English Translation (18 pages).
Written Opinion of the International Searching Authority for PCT/EP2021/058307 mailed Sep. 22, 2022, in English (9 pages).
Office Action issued against corresponding Chinese Patent Application No. 202180026525.0; mailed Sep. 29, 2023; In Chinese with English Translation (16 pages).
Office Action issued against corresponding Korean Patent Application No. 10-2022-7037913; dated Nov. 13, 2023; In Korean with English Machine Translation (29 pages). All references cited were cited in previous IDS'es for the present application.
BMW, U.S. Press Information, Jun. 10, 2015, 24 pages.†

\* cited by examiner
† cited by third party

VEHICLE WINDOW PANE COMPRISING A LIGHT SOURCE AND A LIGHT-CONDUCTING LAYER

CROSS-REFERENCE TO RELATED APPLICATION

This application is a U.S. national phase application filed under 35 U.S.C. § 371 of International Application No. PCT/EP2021/058307, filed Mar. 30, 2021, designating the United States, which claims priority from German Patent Application Number 10 2020 109 338.1 filed on Apr. 3, 2020, which are hereby incorporated herein by reference in its entirety for all purposes.

FIELD

The invention relates to a vehicle window pane having the features of the preamble of claim 1.

BACKGROUND

A vehicle window pane of this kind is known from practice and can be used in particular in the area of a vehicle roof. Here, the vehicle window pane can form a fixed roof element or a cover element of a roof opening system by means of which a roof opening can be closed or opened at will. The known vehicle window pane comprises a window pane body, which can be curved and which is provided with a light-conducting layer. Furthermore, the known vehicle window pane is provided with a light source whose light can be coupled into the light-conducting layer. The light is coupled in via an edge of the light-conducting layer. The light-conducting layer can form the visible surface of the vehicle window pane which is visible from the vehicle interior, the light-conducting layer thus forming a light element of the vehicle window pane, by means of which a vehicle interior may be illuminated, when the light source is activated. The light-conducting layer of the known vehicle window pane has smaller dimensions than the window pane body on whose inner side the light-conducting layer is disposed so that light emitted by the light source can be coupled in via the edge of the light-conducting layer.

SUMMARY

The object of the invention is to provide a vehicle window pane of the kind described above whose light-conducting layer provides as large an illuminated area as possible.

According to the invention, this object is attained by the vehicle window pane having the features of claim 1.

So the invention proposes a vehicle window pane in which the light emitted by the light source can be coupled into the light-conducting layer across a large surface by means of the input coupling element disposed on the inner side of the window pane body assembly. This makes it possible for the light-conducting layer to be adapted to demands in a manner optimized in terms of its dimensions, i.e., its base area. Moreover, only light with certain angles of incidence is coupled into the light-conducting layer. Light beams outside of this range are not coupled in, so they do not propagate in the light-conducting layer. This improves the luminance as well as the light homogeneity across the surface of the light-conducting layer. So the input coupling element directs the light emitted by the light source into the light-conducting layer at defined angles, whereby an increased input coupling efficiency is achieved.

The concept of the invention, according to which the input coupling element is disposed on the inner side of the window pane body assembly, can basically be applied to singlepane safety glass and laminated safety glass.

If the invention is applied to laminated safety glass, the window pane body assembly comprises an outer window pane body and an inner window pane body which is connected to the outer window pane body via a connecting layer. The inner window pane body preferably forms the light-conducting layer. In this case, the input coupling element can be attached directly to the inner side of the inner window pane body.

Of course, it is also conceivable for an additional light-conducting layer into which the light of the light source can be coupled by means of the input coupling element to be applied to the inner window pane body of a laminated safety glass.

In the embodiment in which the inner window pane body forms the light-conducting layer, there is no additional cost for the application of a light-conducting layer. Moreover, the function integration results in advantages in terms of weight and installation space. So the configuration according to the invention with the input coupling element makes it possible for a large-scale ambient light function to be provided by means of the inner window pane body, also in connection with a fixed roof element of a motor vehicle, for example.

The inner window pane body, which can have the same dimensions as the outer window pane body or be smaller, can basically be made of any material usable as a light conductor. For example, the inner window pane body is made of a material comprising glass and/or polycarbonate and/or another type of plastic.

If the window pane body assembly is a laminated safety glass, a connecting layer between the individual window pane bodies is preferably made of a material comprising PVB, EVA and/or TPU. The connecting layer can be clear, i.e., transparent, or dyed.

In a preferred embodiment, the input coupling element of the vehicle window pane according to the invention is in the shape of a bar and preferably disposed close to an edge on the underside of the window pane body assembly. In this case, light can be coupled into the light-conducting layer of the window pane body assembly across the length of the bar-shaped input coupling element.

In a specific embodiment of the vehicle window pane according to the invention, two input coupling elements of the kind described above are provided, which can be disposed close to opposite edges of the window pane body assembly on the underside thereof.

In a preferred embodiment of the vehicle window pane according to the invention, the input coupling element has a wedge-shaped or trapezoidal cross section so as to be able to optimize the input coupling angles of the light coupled into the light-conducting layer by means of the input coupling element. Thus, the input coupling element acts as an optical prism.

The input coupling element, which is in particular a bar-shaped plastic body, is preferably made of a material comprising PMMA (polymethyl methacrylate), PC (polycarbonate), PA (polyamide), COC (cycloolefin copolymer) or COP (cycloolefin polymer).

The refractive index of the input coupling element is in particular adapted to the refractive index of the adjacent light-conducting layer and preferably has a value between 1.40 and 1.65 and in particular between 1.48 and 1.59.

The input coupling element is preferably produced by extrusion or injection molding.

The input coupling element can be provided with a reflective coating, which can comprise metals such as aluminum or silver and which can be applied by vapor deposition or sputtering, to improve the internal reflection.

In an advantageous embodiment of the vehicle window pane according to the invention, an additional deflection structure is disposed between the input coupling element and the window pane body assembly to further improve the input coupling behavior of the light into the light-conducting layer. The additional deflection structure can change the angle of incidence of the light onto the light-conducting layer by appropriate refraction to increase the internal reflection in the light-conducting layer. The additional deflection structure can comprise a number of asymmetrical prisms which have dimensions in the millimeter range or the micrometer range and which are disposed as a three-dimensional array or in lines, as in a Fresnel lens array, for example.

The additional deflection structure can be in one piece with the input coupling element and be formed directly during the production thereof in an extrusion process or an injection molding process, for example. It is also conceivable for the additional deflection structure to be a coating of the input coupling element in the form of a separate structured film, for example.

The input coupling element is preferably glued to the window pane body via an adhesive layer. The adhesive layer, which preferably has a refractive index between 1.40 and 1.65 and in particular between 1.48 and 1.56, can be made of any optically suitable adhesive. For example, the adhesive layer is made of a pressure-sensitive adhesive, a LOCA (liquid optically clear adhesive), EVA (ethylene-vinyl acetate), PVB (polyvinyl butyral), TPU (thermoplastic polyurethane), an epoxy adhesive or an acrylic adhesive.

The selected materials preferably have refractive indices that minimize a refraction of the light beams at the boundary surfaces and optimize the input coupling efficiency at the ideal angular conditions.

The refractive indices of an inner window pane body made of glass are in particular 1.52, whereas the refractive indices of the input coupling element and of the adhesive by means of which the input coupling element is connected to the inner window pane body can vary as a function of the selected material. If PMMA is used for the input coupling element, the refractive index is 1.49. In this case, the adhesive has a refractive index of 1.52, for example. If an input coupling element made of polycarbonate is used, the refractive index is 1.58, for example, whereas the refractive index of the adhesive used is 1.56. If the input coupling element is made of COP, its refractive index is 1.52. In this case, the adhesive via which the input coupling element is connected to the inner glass body preferably also has a value of 1.52.

In a specific embodiment of the vehicle window pane according to the invention, the input coupling element is molded from a casting resin, which is preferably molded directly onto the window pane body assembly by casting. In this case, the light source, which can particular be an LED bar, can be an insert of the casting resin; i.e., the light source can be encased in the casting resin.

A light conductor, which is connected to the light source and can be a rod or a string, can be disposed on a lateral surface of the input coupling element to couple the light of the light source, which is in particular a high-power LED module, into the input coupling element itself. For example, the light conductor is made of a material comprising PC and/or PMMA. The light conductor can be in one piece with the input coupling element.

The lateral surface of the input coupling element facing the light conductor can be plane or concave or convex to focus the light.

To improve the process of coupling the light into the input coupling element, the light conductor can comprise an additional output coupling element which directs the light to be coupled out in the direction of the corresponding lateral surface of the input coupling element. The output coupling element can comprise a print on the light conductor, a prism structure, a dot structure or a coextruded scattering material disposed on the light conductor. Moreover, the output coupling element can be produced in one piece with the light conductor or be a separate structural element. Furthermore, a periodicity of the output coupling element across the length of the light conductor is conceivable. Also, the density of the output coupling element can change across the length of the light conductor so that a light homogeneity across the length of the light-conducting element is ensured.

Part of the light conductor can also be provided with a reflective coating, for example.

In an alternative embodiment of the vehicle window pane according to the invention, the light source is disposed directly on a lateral surface of the input coupling element. For example, the light source, which is in particular a high-power LED module, is an LED bar or an LED strip with a plurality of LEDs which emit their light directly into the input coupling element.

Furthermore, a cladding element or a cover which covers the input coupling element can be disposed on the inner side of the window pane body assembly. In this embodiment, which meets high optical demands, the light source and, if applicable, the light conductor by means of which light is coupled into the input coupling element can additionally be located behind the cover. The cover, which forms a housing, can be glued to the window pane body assembly.

It is also conceivable for the input coupling element to be accommodated in a molded section which is molded onto the window pane body assembly and made of polyurethane foam, for example. In this case, the reflective coating on the input coupling element prevents absorption losses through the molded section.

In a specific embodiment of the vehicle window pane according to the invention, the cladding element and/or the molded section push/pushes the input coupling element in the direction of the window pane body assembly to ensure an optimal optical transition between the input coupling element and the window pane body assembly at all times. So the cladding element or the molded section exerts pressure on the input coupling element, thus ensuring that the optical contact between the input coupling element and the window pane body assembly is maintained.

In a specific embodiment of the vehicle window pane according to the invention, the input coupling element is optically coupled with the window pane body assembly via a transparent immersion agent to further improve the transition between the input coupling element and the window pane body assembly. So in this embodiment, a layer, e.g., a film, made of an optical immersion agent is disposed between the input coupling element and the window pane body assembly. The immersion agent can comprise an oil and/or a gel or be an oil and/or a gel.

In a preferred embodiment of the vehicle window pane according to the invention, the immersion agent has a refractive index between 1.47 and 1.59 and in particular between 1.51 and 1.52, the refractive index thus being adapted to the refractive index of a glass window pane body of the window pane body assembly.

The viscosity of the immersion agent can be between 10 and 50,000 cP.

The invention also relates to a vehicle roof comprising a vehicle window pane of the kind described above.

Other advantages and advantageous configurations of the subject matter of the invention are apparent from the description, the drawing, and the claims.

BRIEF DESCRIPTIONS OF THE DRAWINGS

Illustrative examples of a vehicle roof with a vehicle window pane according to the invention are schematically illustrated in the drawing and will be discussed in more detail in the following description.

DETAILED DESCRIPTION

Figure 1:
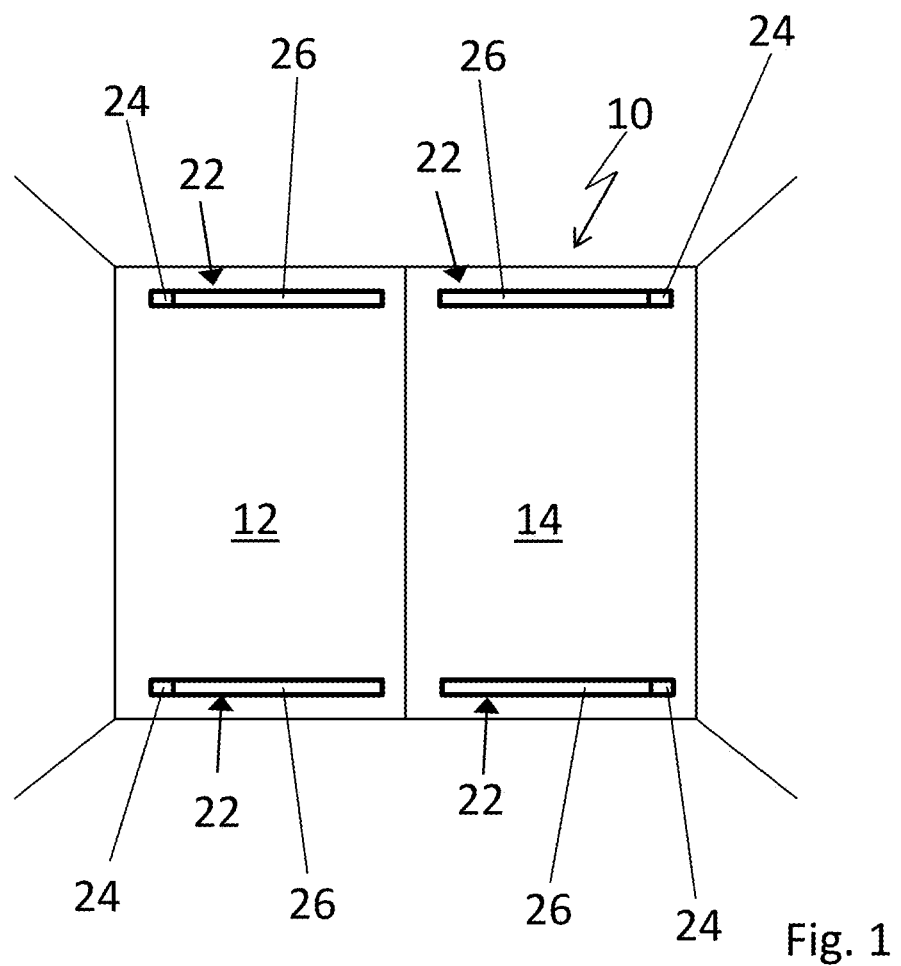
FIG. 1 is a schematic top view of a vehicle roof with a vehicle window pane according to the invention.

FIG. 1 shows a vehicle roof 10 of a motor vehicle not shown in detail otherwise. Vehicle roof 10 is a panoramic roof which has a displaceable cover element 12 and a fixed roof element 14, which is fixed to the vehicle body in an immobile manner. Both cover element 12 and fixed roof element 14 each comprise a glass element which is a vehicle window pane and configured as a laminated safety glass provided with an ambient light function. In this regard, the structure of cover element 12 corresponds to that of fixed roof element 14. This structure is illustrated in more detail in FIG. 2.

Roof elements 12 and 14, which are each a vehicle window pane, each comprise a laminated component comprising an outer window pane body 16 and an inner window pane body 18. Outer window pane body 16 is made of a curved glass plate, which is made of dyed soda-lime glass, for example. It is also conceivable for outer window pane body 16 to be made of a plastic element, such as a polycarbonate element. Inner window pane body 18 can also be made of an inorganic glass, such as soda-lime glass, or a polymer, such as a polycarbonate. Furthermore, in the context at hand, inner window pane body 18 forms a light-conducting layer in which light coupled into its volume propagates.

Outer window pane body 16 and inner window pane body 18 are connected via a lamination layer, i.e., connecting layer 20, which can be made of a material such as PVB, EVA or TPU. Moreover, connecting layer 20 can be clear, i.e. fully transparent, or dyed. In the case at hand, connecting layer 20 has a thickness of 0.76 mm, but it can also have a different thickness.

Outer window pane body 16 and inner window pane body 18, which each have a thickness of approximately 2.1 mm in the case at hand, form a window pane body assembly having an outer side, which faces the vehicle environment, and an inner side, which faces the vehicle interior. On the inner side, the window pane body assembly is provided with an illuminator 22, by means of which the ambient light function can be implemented, on either side of a vertical longitudinal center roof plane.

Illuminators 22 each extend in the longitudinal vehicle direction and are disposed on the respective lateral edges of cover element 12 and the respective lateral edges of fixed roof element 14.

Illuminators 22 each comprise a light source 24, which comprises an LED array and is disposed on an end face of a light conductor 26, which is formed by a rod or a string and comprises a PMMA material and/or a polycarbonate material, for example. Light conductor 26 can be produced by extrusion or injection molding.

Furthermore, illuminators 22 each comprise a bar-shaped input coupling element 28, which extends across the length of associated illuminator 22 and has a wedge-shaped or triangular cross section in the case at hand. So input coupling elements 28 each form a prismatic body. The latter is preferably made of a plastic material by extrusion or injection molding; in particular, PMMA, PC, PA, COC and/or COP, whose refractive indices are between 1.48 and 1.59, can be used as materials.

Input coupling elements 28 are each fixed to the window pane body assembly via an adhesive layer 30. Adhesive layer 30 has a refractive index which is in the range of the refractive index of input coupling element 28 or between that of input coupling element 28 and inner window pane body 18 and which is in particular between 1.48 and 1.56. A pressure-sensitive adhesive, a liquid optically clear adhesive, EVA, PVB, TPU, an epoxy adhesive or an acrylic adhesive can be used as the material for adhesive layer 30.

Inner window pane body 18 has a refractive index of 1.52.

Furthermore, illuminators 22 are each provided with a cladding element 32, which is also attached to the underside of the window pane body assembly, i.e., to the underside of inner window pane body 18, and covers input coupling element 28, light conductor 26, and light source 24.

When light source 24 is activated, the light it emits is coupled into light conductor 26 and from the light conductor into input coupling element 28. The internal reflection at the boundary surfaces of input coupling element 28 couples the light into inner window pane body 18, which is a light-conducting layer, via adhesive layer 30, the light being able to propagate in inner window pane body 18 by internal reflection at the boundary surfaces. The light can be coupled out of inner window pane body 18 in the direction of the vehicle interior through scattering elements, which inner window pane body 18 has. For example, a print which scatters the light in the direction of the vehicle interior is applied to the upper side of inner window pane body 18.

In an alternative embodiment, light conductor 26 and input coupling element 28 are one piece.

Figure 2:
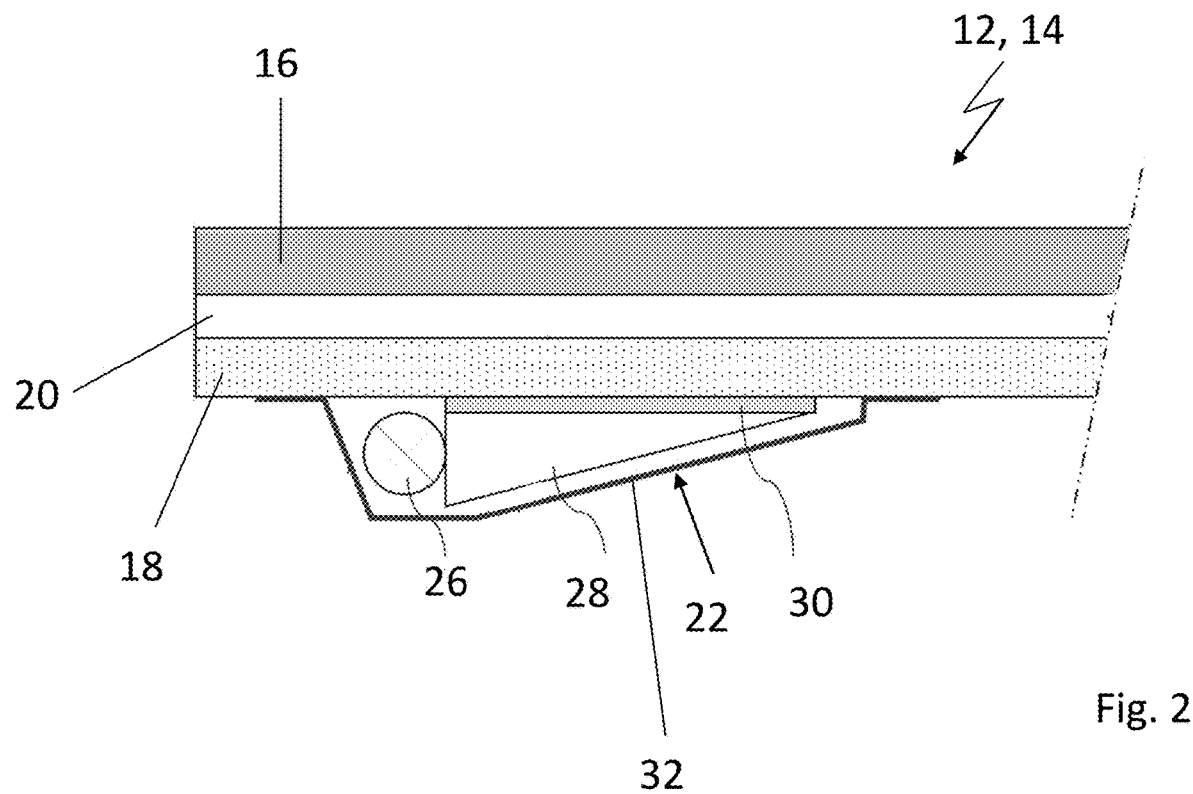
FIG. 2 is a schematic section through the vehicle window pane of the vehicle roof of FIG. 1.
Figure 3:
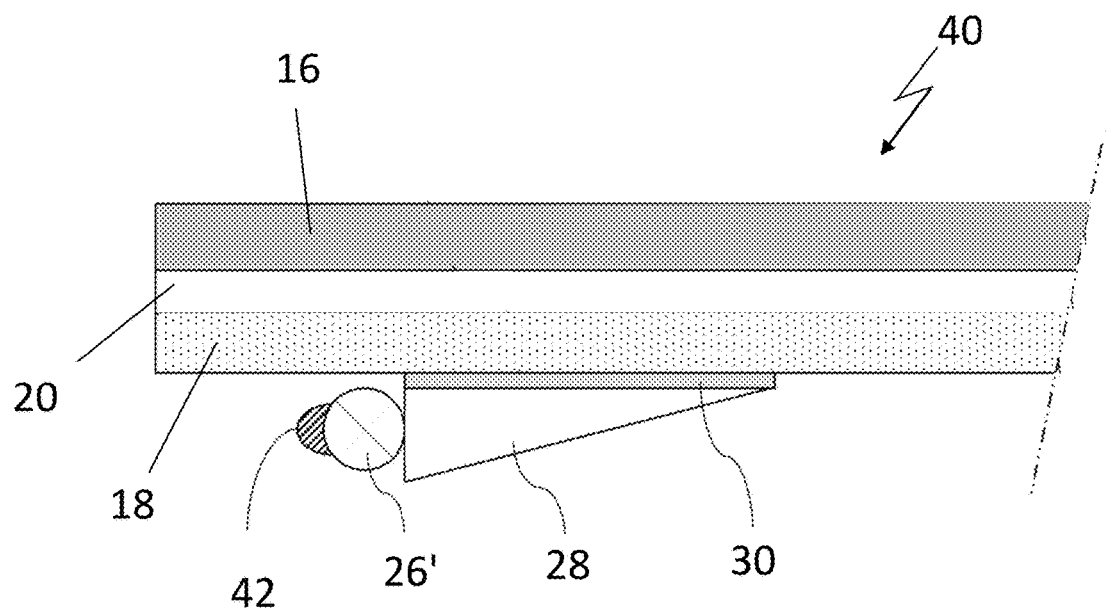
FIG. 3 is a section through a second embodiment of a vehicle window pane corresponding to FIG. 2.

FIG. 3 shows a vehicle window pane 40, which largely corresponds to that of FIG. 2 but differs from it in that it has a light conductor 26', which is disposed on a lateral surface of input coupling element 28 and is provided with an additional output coupling element 42, which extends across the length of light conductor 26. Output coupling element 42 supports the coupling of light out of light conductor 26' in the direction of input coupling element 28. Output coupling element 42 can be produced in one piece with light conductor 26' or be an additional structure which is formed by a print, a prism structure, a dot structure or the like.

Otherwise, vehicle window pane 40 corresponds to that of FIG. 2.

Figure 4:
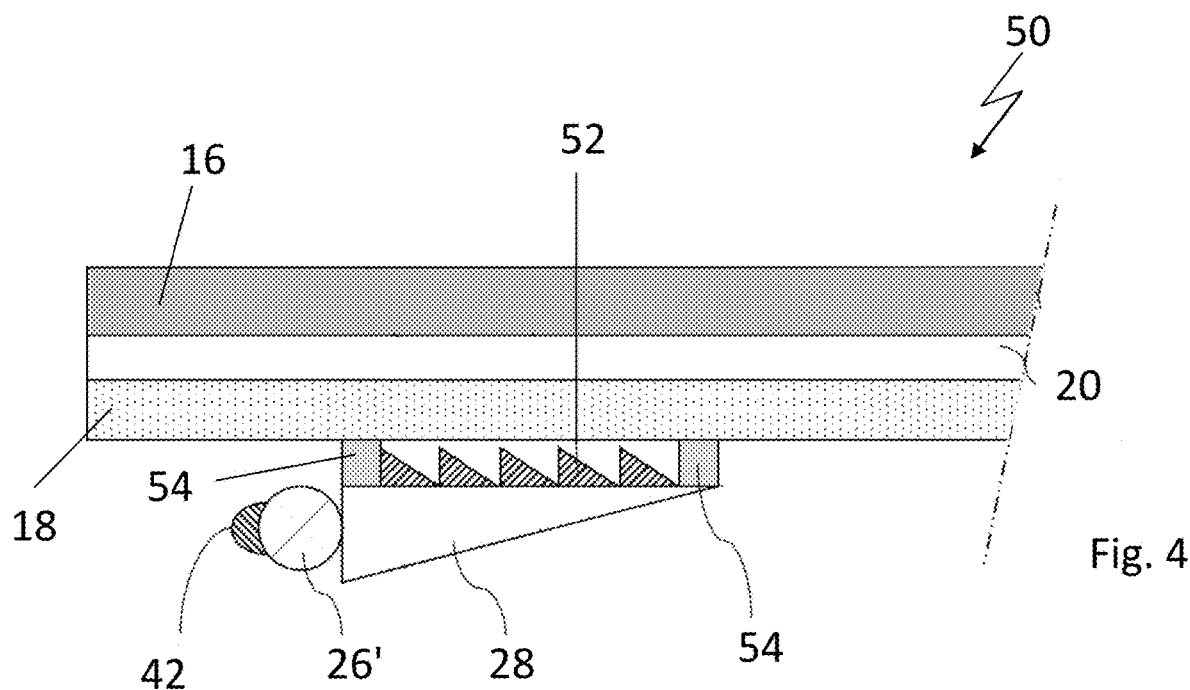
FIG. 4 is a section through a third embodiment of a vehicle window pane.

FIG. 4 shows a vehicle window pane 50, which largely corresponds to that of FIG. 3 but differs from it in that input coupling element 28 comprises an additional deflection structure 52 on its surface facing the window pane body assembly, additional deflection structure 52 optimizing the input coupling of the light emitted in the direction of the window pane body assembly and being formed by rows of asymmetrical prisms having dimensions in the micrometer range or the millimeter range or by a lens array, such as a Fresnel lens array. Additional deflection structure 52 can be a coating of input coupling element 28 or be produced in one piece with the latter. At its edges, input coupling element 28 is connected to the underside of inner window pane body 18 of the window pane body assembly via adhesive strips 54.

Otherwise, vehicle window pane 50 corresponds to that of FIG. 3.

Figure 5:
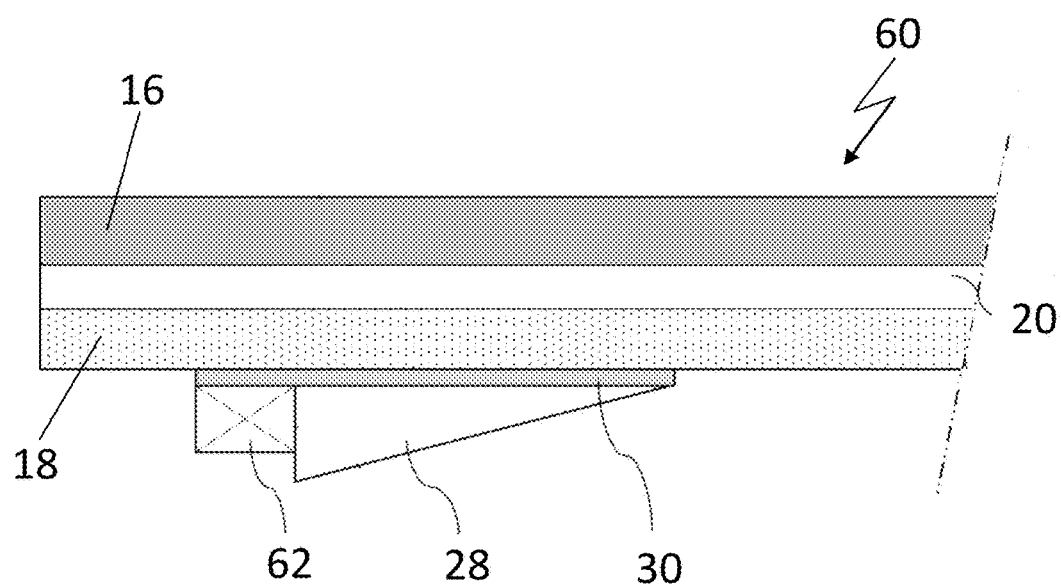
FIG. 5 is a section through a fourth embodiment of a vehicle window pane.

FIG. 5 shows a vehicle window pane 60, which again largely corresponds to that of FIG. 3 but differs from it in that it comprises an LED bar 62 as a light source, LED bar 62 comprising a plurality of LEDs across the length of input coupling element 28 whose light can be coupled into input coupling element 28 directly via a lateral surface. LED bar 62 is connected to the underside of inner window pane body 18 via a common adhesive layer 30.

Otherwise, vehicle window pane 60 corresponds to that of FIG. 3.

Figure 6:
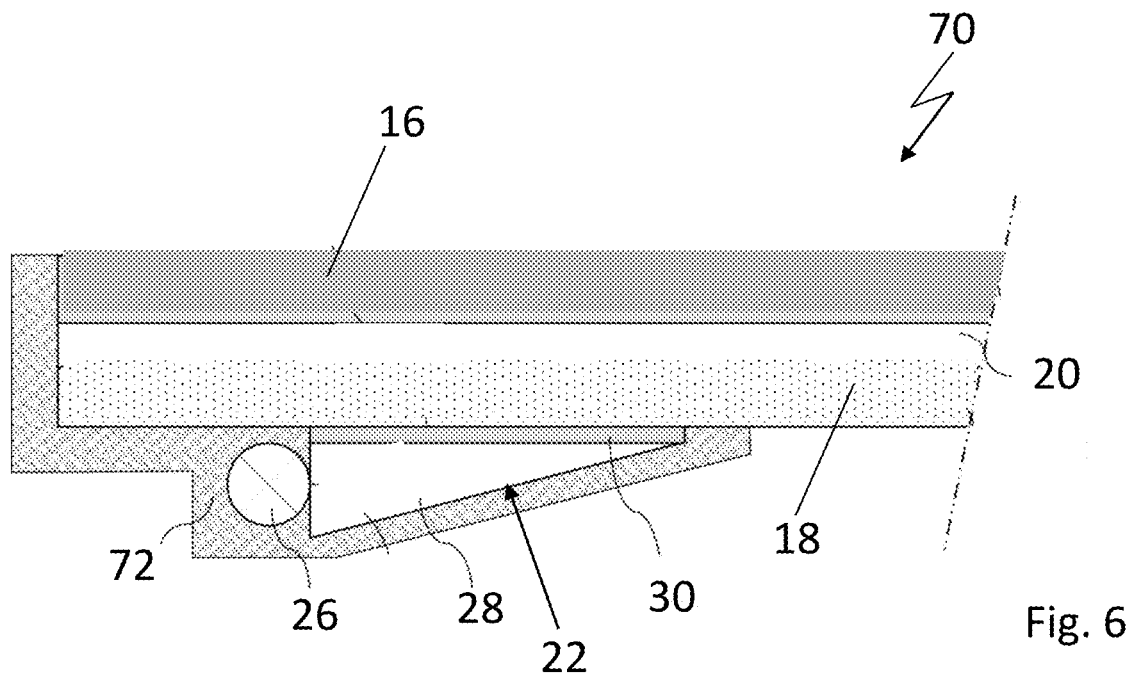
FIG. 6 is a section through a fifth embodiment of a vehicle window pane.

FIG. 6 shows a vehicle window pane 70, which largely corresponds to that of FIG. 2 but differs from it in that illuminator 22, i.e., light conductor 26, and input coupling element 28 are not covered by a housing-like cladding element 32. Instead, these elements are accommodated in a polyurethane foaming 72, which forms a molded section and which is foam injected around or onto the edge of the window pane body assembly comprising outer window pane body 16, inner window pane body 18, and connecting layer 20.

Otherwise, vehicle window pane 70 corresponds to that of FIG. 2.

Figure 7:
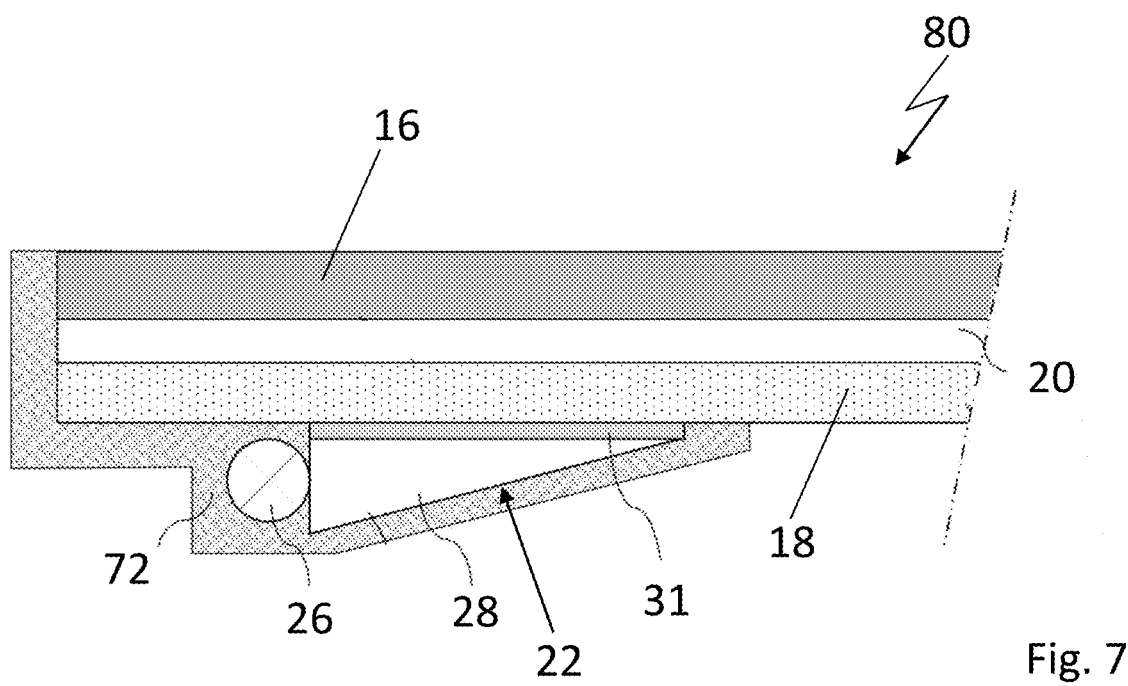
FIG. 7 is a section through a sixth embodiment of a vehicle window pane.

FIG. 7 shows a vehicle window pane 80, which largely corresponds to that of FIG. 6 but differs from it in that input coupling element 28 is connected to inner window pane body 18 of the window pane body assembly via an immersion agent 31. Immersion agent 31 forms a film between input coupling element 28 and inner window pane body 18 and has a refractive index of 1.51 and a viscosity of approximately 30,000 cP. Input coupling element 28 is held on inner window pane body 18 by polyurethane foaming 72, which forms a molded section and which also pushes input coupling element 28 against inner window pane body 18, thus maintaining an optimal optical coupling between input coupling element 28 and inner window pane body 18.

Otherwise, vehicle window pane 80 with illuminator 22, which comprises input coupling element 28 and immersion agent 31, corresponds to that of FIG. 6.

Figure 8:
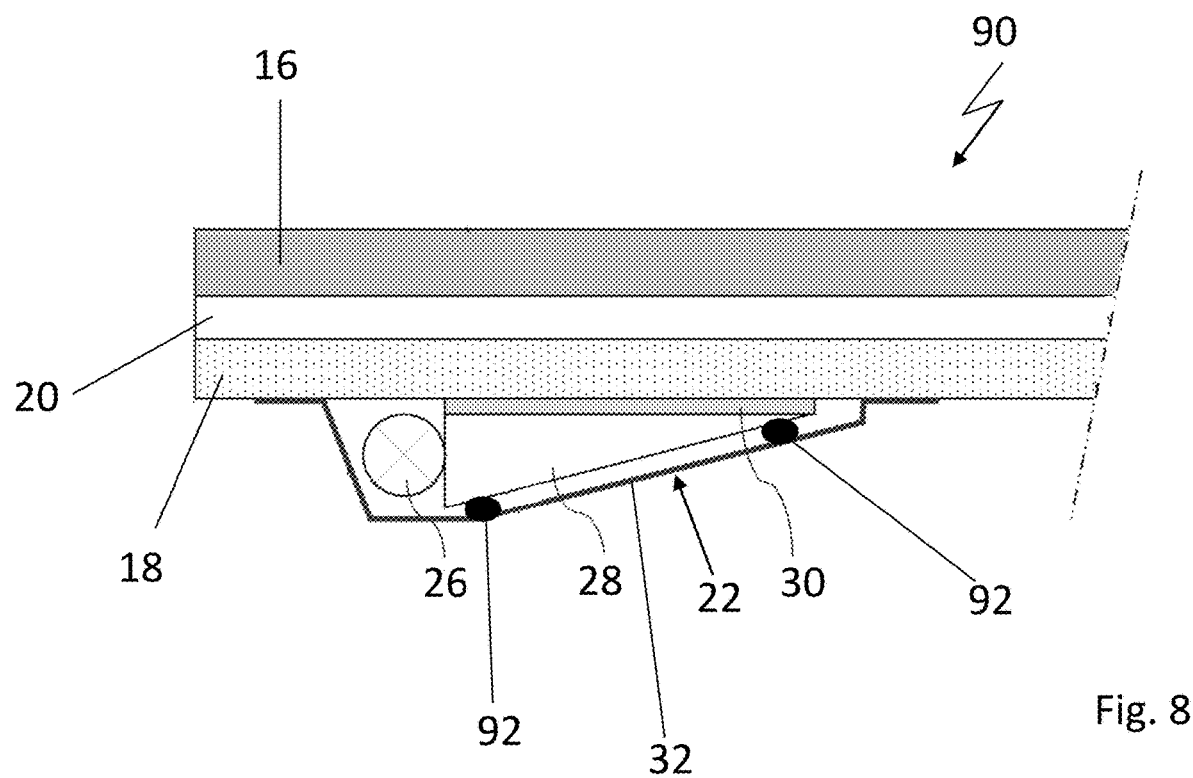
FIG. 8 is a section through a seventh embodiment of a vehicle window pane.

FIG. 8 shows a vehicle window pane 90, which largely corresponds to that of FIG. 2 but differs from it in that pressure elements 92 are disposed between cladding element 32 and input coupling element 28, cladding element 32 pushing input coupling element 28 in the direction of inner window pane body 18 by means of pressure elements 92 so that an optimal optical transition between input coupling element 28 and inner window pane body 18 is ensured at all times.

Otherwise, vehicle window pane 90 corresponds to that of FIG. 2.

Figure 9:
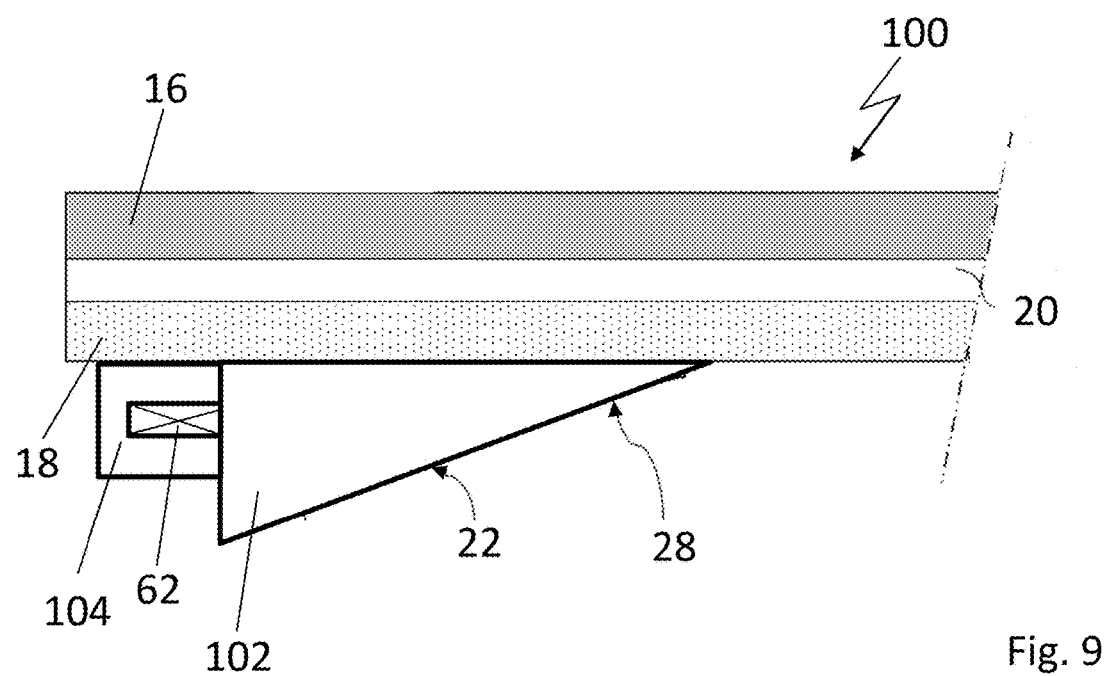
FIG. 9 is a section through an eighth embodiment of a vehicle window pane.

FIG. 9 shows a vehicle window pane 100, which largely corresponds to that of FIG. 5 but differs from it in that it comprises an illuminator 22 on its underside, illuminator 22 having an input coupling element 28, which is made of a casting resin molded directly onto the underside of inner window pane body 18 of the window pane body assembly. Input coupling element 28, whose input coupling portion 102 has a triangular or wedge-shaped cross section, is integrally provided with an accommodating portion 104, which accommodates an LED bar 62, which is the light source of illuminator 22, as an insert.

Otherwise, the vehicle window pane of FIG. 9 corresponds to that of FIG. 5.

The invention claimed is:

1. A vehicle roof comprising:
   a window pane body assembly having an outer side, which faces a vehicle environment, and an inner side, which faces a vehicle interior, and having a light-conducting layer;
   wherein illuminators are provided on either side of a vertical longitudinal center roof plane,
   each illuminator extending in the longitudinal vehicle direction and being disposed on the respective lateral edge of the window pane body,
   wherein each illuminator comprises a light source configured to couple its light into the light-conducting layer, and
   an input coupling element coupling light emitted by the light source into the light-conducting layer is attached on the inner side of the window pane body assembly,
   wherein the input coupling element is attached to the window pane body assembly by an adhesive layer,
   wherein the light source is disposed on a lateral surface of the input coupling element,
   wherein the light source is an LED bar comprising a plurality of LEDs
   wherein the window pane body assembly comprises an outer window pane body and an inner window pane body which is connected to the outer window pane body by a connecting layer, the inner window pane body forming the light-conducting layer, and the input coupling element being attached to the side of the inner window pane body facing away from the outer window pane body.

2. The vehicle window pane according to claim 1, wherein the input coupling element is a body of material which is transparent to the light of the light source and which is in the shape of a bar.

3. The vehicle window pane according to claim 1, wherein the input coupling element has a wedge-shaped or trapezoidal cross section.

4. The vehicle window pane according to claim 1, wherein the input coupling element is provided with an additional deflection structure on its side facing the window pane body assembly.

5. The vehicle window pane according to claim 4, wherein the additional deflection structure is in one piece with the input coupling element or is a coating of the input coupling element.

6. The vehicle window pane according to claim 1, wherein the outer window pane body is made of at least one of an inorganic glass and a polymer glass, and the inner window pane body is made of at least one of an inorganic glass and a polymer glass.

7. The vehicle window pane according to claim 1, wherein the adhesive layer comprises at least one of a pressure-sensitive adhesive, a liquid optically clear adhesive, an adhesive comprising EVA, PVB, TPU, an epoxy adhesive, and an acrylic adhesive.

8. The vehicle window pane according to 1, wherein the adhesive layer has a refractive index between 1.40 and 1.65.

9. The vehicle window pane according to claim 1, wherein the input coupling element is molded from a casting resin and molded onto the window pane body assembly.

10. The vehicle window pane according to claim 9, wherein the light source, which is an LED bar, is an insert of the casting resin.

11. The vehicle window pane according to claim 1, wherein the input coupling element is made of at least one of a material comprising PMMA, PC, PA, COC and COP.

12. The vehicle window pane according to claim 1, wherein the input coupling element has a refractive index between 1.40 and 1.65.

13. The vehicle window pane according to claim 1, wherein a light conductor is attached on a lateral surface of the input coupling element, the light conductor being connected to the light source and being in one piece with the input coupling element.

14. The vehicle window pane according to claim 13, wherein the light conductor is connected to an output coupling element, the output coupling element directing light in the direction of the input coupling element.

15. The vehicle window pane according to claim 1, wherein the inner window pane body has a base area which corresponds to that of the outer window pane body.

16. The vehicle window pane according to claim 1, wherein the input coupling element further comprises at least one of a cladding element and accommodated in a molded section which is connected to the window pane body.

17. The vehicle window pane according to claim 16, wherein the cladding element and the molded section push the input coupling element in the direction of the window pane body assembly so that an optical contact between the input coupling element and the window pane body assembly is maintained.

18. The vehicle window pane according to claim 1, wherein the input coupling element is coupled to the window pane body assembly by a transparent immersion agent.

19. The vehicle window pane according to claim 18, wherein the immersion agent comprises at least one of an oil and a gel.

20. The vehicle window pane according to claim 18, wherein the immersion agent has a refractive index between 1.47 and 1.59.

21. The vehicle window pane according to claim 18, wherein the immersion agent has a viscosity between 10 and 50,000 cP.

\* \* \* \* \*